Figure 1:
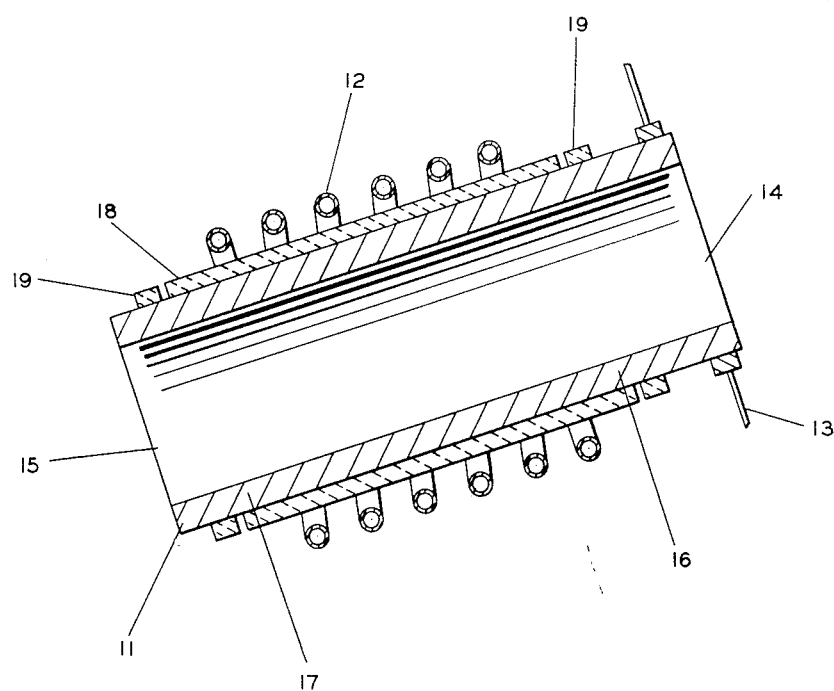

Jan. 3, 1956      M. G. FONTANA      2,729,556
METHOD FOR MAKING PIG IRON OR STEEL
Filed Dec. 2, 1952      2 Sheets-Sheet 1

INVENTOR.
MARS G. FONTANA
BY
Jerome R. Cox
ATTORNEY

Jan. 3, 1956 M. G. FONTANA 2,729,556
METHOD FOR MAKING PIG IRON OR STEEL
Filed Dec. 2, 1952 2 Sheets-Sheet 2

INVENTOR.
MARS G. FONTANA
BY
Jerome R. Cox
ATTORNEY

United States Patent Office 2,729,556
Patented Jan. 3, 1956

2,729,556

METHOD FOR MAKING PIG IRON OR STEEL

Mars G. Fontana, Columbus, Ohio

Application December 2, 1952, Serial No. 323,659

7 Claims. (Cl. 75—11)

The invention illustrated and disclosed in this application relates to methods of and equipment for supplying heat to carry out metallurgical or other chemical reactions. In the particular embodiments illustrated, there are disclosed methods of and equipment for reducing iron ore and particularly for reducing fine metallic ores such as finely ground magnetite or hematite without the necessity for pelletizing or agglomerating these fine ores.

The well established and conventional equipment for reducing iron ore is the blast furnace. In the blast furnace combustion is forced by a current of air under pressure which is fed up from the bottom while ore, coke and limestone are fed intermittently at the top. Such furnaces are usually from 50 to 100 feet high and have a width at the widest portion (i. e. at the "boshes") of about 24 feet. Gases such as carbon monoxide are produced and pass out through a pipe at the top. These gases are usually used in heating the blast. The furnace below the "boshes" narrows gradually to a hearth at the base which is pierced with holes for the blowing pipes through which the air is forced by powerful blowing engines. The hearth is also pierced with a hole from which the molten iron is periodically tapped. A slag notch at a higher level allows the molten slag to run continuously from above the fused metal. About 3 to 5 tons of air will pass through the furnace per ton of iron made. The iron is produced as pig iron which contains from about 2.2 to 4.5% of carbon together with silicon, sulfur, phosphorus and manganese.

The so-called low grade iron ores usually require beneficiation before they can be economically utilized in the blast furnace. By beneficiation much of the impurities from the natural ore is removed and there is an increase in the percentage of iron content in the ore. Beneficiation usually involves grinding or otherwise reducing the ore to a finely divided state. The usual product of such a beneficiation plant is thus an ore in a finely divided form. This finely divided ore presents problems in shipment and in addition cannot be charged as such into the blast furnace because much of it would be blown out of the furnace by the large volume of gases passing through the furnace. The operation of the blast furnace and the difficulties thereof, especially in the handling of finely divided ore are well known to persons familiar with the art.

Prior inventors have suggested the use of slanting rotating furnaces together with electrical heating for refining iron ore, especially in the manufacture of sponge iron. They have also suggested a similar apparatus for iron hardening and other heat treating of metal articles. Heating of ore, metal or metal articles by electrical induction has also been proposed. It has even been proposed to heat by electrical induction a carbon crucible for ore. It has also been proposed to use a slanting rotating furnace in combination with a separate induction furnace but so far as I am aware, no one has heretofore proposed to heat by electrical induction a rotating furnace to a temperature sufficient to reduce finely divided iron ore contained in such a furnace and melt the iron. Nor has any one proposed to use a tube of carbon or of other electricity conducting material having a high melting point, as a rotating furnace for reducing ores.

One object of this invention is to provide an improved means for supplying heat for carrying out metallurgical and other reactions.

Another more specific object of this invention is to provide improved means for reducing iron ores to pig iron and similar products.

A still more specific object of the invention is to provide improved means for the reduction of the so-called low grade iron ores.

A further object of the invention is to provide an improved furnace for reducing such ores.

A further object of my invention is the provision of a method for reducing ore which can utilize finely divided ore without the necessity of pelletizing such finely divided ore.

A further object of my invention is the provision of a method and apparatus for reducing ore which is efficient in the reduction of relatively small quantities of ore especially as compared with the relatively large quantities which are required for efficient operation of reducing processes in a blast furnace.

A further object of my invention is the provision of a method and apparatus for reducing ore which may be efficiently used at a point close to the mines.

A further object of my invention is the provision of a method and apparatus for the reduction of iron ore which is faster in operation than heretofore proposed methods for the reduction of ore.

A further object of my invention is the provision of a method and apparatus for the reduction of iron ore which does not require the feeding of limestone with the ores, although limestone or other ingredients such as slag forming constituents could be added if desirable.

A further object of my invention is the provision of a method and apparatus for the reduction of iron ore which saves in the actual costs of shipping because the weight of the iron oxide shipped is greater than the weight of the equivalent iron.

A further object of my invention is the provision of a method and apparatus for reducing iron ore in which it is not necessary to premix coke with the iron ore inasmuch as the furnace itself serves as a mixer.

A further object of the invention is to provide means for continuously reducing finely divided metallic ores.

A feature of the invention is the provision of a slanting rotating furnace or tube which is itself electrically heated.

A further feature of my invention is the use in such a furnace of a carbon tube or tube of a similar electricity conducting material having a high melting point.

Further objects and features of this invention will be apparent from the subjoined specification and claims when considered in connection with the accompanying drawings which disclose furnaces which comprise embodiments of my invention.

Figure 2:
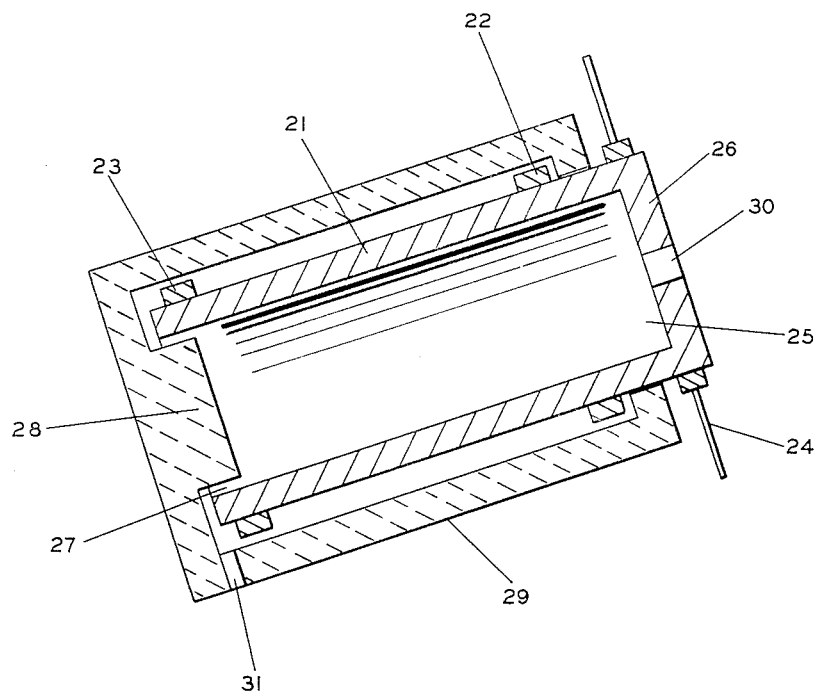

In the drawings:

Fig. 1 is a view in vertical section of a furnace which can be used in carrying out my new method; and Fig. 2 is a view in vertical section of another furnace which is another embodiment of my invention.

The equipment illustrated in Fig. 1 consists of a graphite or carbon tube 11, surrounded by a separated water-cooled copper coil 12. The copper coil is connected to a high frequency electric power source. When this electric power is turned on, the carbon tube is heated inductively. As may be readily seen, the tube is inclined and is rotated by a turning mechanism 13. Thus, ore and other raw material placed in the upper or inlet end 14 of the tube 11 will travel or move towards the lower or outlet end 15 as the tube is rotated. A mixture of finely divided carbon and finely divided ore (essentially iron oxide) is fed into the inlet end 14 of the tube.

The heat induced in the carbon tube is concentrated in a hot zone which extends approximately from a portion 16 thereof to a portion 17 thereof. As the ore moves along the tube, it enters this hot zone and the iron oxide is reduced by the finely divided carbon to iron. The carbon tube is heated to a temperature sufficiently high to melt the iron. The temperatures required in the reactions that occur in the reduction of iron ore to iron and the temperatures required to melt the iron are well known to those familiar with the metallurgical art. The temperature of the tube is controlled by the electrical power input, but it will, of course, be understood that the carbon tube is heated to a relatively high temperature in order to communicate this heat to the iron ore and to reduce the iron ore to iron and melt the iron. As the result, molten iron comes out of the outlet end 15 of the tube 11.

Because the ore is in finely divided form substantially no current is induced in the iron ore itself. However, the induced current in the carbon tube rapidly heats the tube and thus heats the ore therein to a relatively high temperature. The melting point of the carbon itself is about 3500° C. The melting point of pure iron is about 1535° C. and the melting points of iron-carbon alloys is substantially lower. The finely ground carbon fed with the iron ore is also heated and tends to saturate the iron with carbon so that little, if any, of the carbon from the graphite or carbon tube reacts with the iron. The exterior of the carbon tube is protected by a ceramic covering 18 which covers the hot zone of the carbon tube and prevents oxygen from contacting with the hot carbon from the outside. This ceramic covering 18 extends beyond the area surrounded by the induction coil and thus overlaps the hot zone. Ceramic collars, such as the collars 19, are cemented to the carbon tube at each end of the ceramic covering to keep the ceramic covering in position.

A turning mechanism 13 is provided so that the carbon tube 11, together with the ceramic covering 18 which serves as a covering for it, may be continuously or intermittently turned while the tube is being heated in order to mix the carbon and iron oxide powder thoroughly (in case it has not been premixed) as it passes down the tube and in order that the powder may flow more easily down the tube. It will be noticed that the tube is inclined about 30° to permit the mixture to move down the tube when the tube is rotated. I point out that while the tube is heated to a temperature sufficiently high to melt the iron, such a temperature is not high enough to melt the carbon. I also wish to point out that a relatively short time is required for the reaction to proceed because of the finely divided nature of the mixture and the intimate contact between the particles in the mixture. The carbon thus quickly reduces the iron oxide to iron.

Some of the carbon unites with the iron to form the iron-carbon alloy. Depending upon the amount of carbon which is provided the carbon content of the pig iron may probably be varied. In one operation in which I fed a mixture of one part of finely divided carbon and four parts of finely divided beneficiated hematite ore into the inlet end of the tube, where the ore contained approximately 61% total iron, the product produced by the operation on analysis showed a content of 95.6% of iron and 4.1% carbon. The product was thus essentially an iron-carbon alloy or practically pure pig iron or cast iron.

In this operation the ores used contained approximately 4% silica or silicon dioxide. Globules essentially of silica were obtained as a separate product of the furnace which globules were easily separated from the iron.

Premixing may be desirable but is not necessary inasmuch as the tube is a mixer by itself. In the embodiment illustrated in Fig. 2 the tube 21 is also of carbon. Contacting therewith at opposite ends are rings or brushes 22 and 23 which are connected to a suitable source of electrical current. These rings may, if desired, be of carbon or of metal such as copper. A turning mechanism 24 is provided. The inlet end 25 has a partial closure 26 integral with the tube. The outlet end 27 is provided with a separated circular central partial closure 28. A non-rotating insulating jacket 29 integral with the closure 28 substantially surrounds the furnace and this jacket is maintained substantially filled with an inert gas to prevent oxidation of the carbon tube 21. The closure 26 has a central opening 30 through which raw materials are fed. The jacket 29 has an opening 31 below the outlet end 27 of the tube so that iron and other products may come out.

Inasmuch as under the present system of refining iron ore commercially, the ore ships travelling to the mines or to the docks near to them usually go up to the mines or to the mine docks empty, and inasmuch as the amount of coke or carbon which is required in my process is smaller than the amount of coke which is required in the blast furnace process (where the coke is also used for a fuel for heating the furnace) there is comparatively little expense attached to the shipping of the coke or carbon up to the ore field. Electric power is available in relatively cheap form in many of the ore fields.

I supply heat by electricity. I supply coke or carbon only for the purpose of reacting with the iron ore to reduce it to iron. The blast furnace uses coke both for fuel for heating and for reaction. Thus I require less coke or carbon than in the blast furnace process.

In blast furnaces, fine materials may not be used, inasmuch as they would be blown out of the furnace. In the process described here, I prefer a finely divided material inasmuch as the materials in finely divided form react much more rapidly.

There are two different beneficiation processes which are sometimes used. In one, the ore is ground and the impurities are separated by flotation. In a second process, a magnetic ore such as magnetite is either mined or formed from other ore and impurities are separated by magnetic processes.

The carbon tubes in the drawings may be varied in size over wide ranges. I have used a carbon tube like that shown in Fig. 1 which is about 12" long and about 2" outside diameter with a wall thickness of about ⅜". A ceramic tube surrounded the carbon tube to insulate the carbon tube from the air and from the coil and to prevent the carbon from burning. The tube was inclined about 30°. A brass ring was attached to the upper end of tube for turning the tube. A mixture of finely divided carbon and iron oxide powder was fed into the upper or right hand end of the tube. As the tube was turned, this mixture slid along the walls of the tube and down the tube into the hot zone. The high temperature (first) produced a reaction such that the carbon reduced the iron oxide to iron, and (second) also melted the iron. The melted iron then rolled out of the lower end of the tube.

The ends of the tube may be open to the air so that some air passes through the tube. The ends of the tube may be substantially closed so that a minimum of air passes through the tube. Another method is to feed a neutral gas such as argon or helium into the lower end of the tube in order to prevent the entry of any oxygen or air into the tube and to insulate the interior of the carbon tube from oxygen. The carbon tube will not be consumed rapidly in any event because the iron ore contacts with powdered carbon.

Carbon, coke, coal, charcoal, or other carbonaceous material may be used. The amount of carbon picked up by the iron might be controlled by the proportions of the mixture, the speed of travel down to the end of the tube or furnace, the heat developed, and other factors. It thus might be possible to produce steel by this process. The rate of output of the furnace could be varied by changing the slope of the tube, speed of rotation, the temperature and other factors. The reaction occurs rapidly (in a matter of seconds) because of the fineness of the oxide powder and the fine carbon powder thoroughly mixed with it.

The temperature gradients in the tube can be varied by changing the length of the tube, the length of the coil, external cooling of the tube, the power input, and by other means. Pelletized mixtures of carbon and iron oxide powder could be fed into the furnace if desired, although I prefer to use finely divided ore and carbon because of the fact that such finely divided ingredients heat and react more rapidly. The capacity of even a small tube may be quite high, but larger tubes or furnaces for tonnage production could be used. A preferred process might be to mix the carbon powder (or pulverized coal, which is a common industrial fuel), and the iron oxide powder in an iron ball mill; feed it to the tube furnace or kiln by means of a screw conveyor; collect the molten iron in a heated container or furnace for subsequent use as may be desired; or collect it directly in molds to form pigs or blocks of iron; or run the molten iron into a tank of water to produce shot; or otherwise utilize the product. The product of my process as above described, could be transported directly to open hearth or other furnaces for the immediate production of steel, or it could be used in blast furnaces inasmuch as my product is of substantial size and is not in the form of powder such as beneficiated ore usually is. A refractory lining for the carbon tube could be used, although I would prefer not to, inasmuch as such refractory lining would form an insulatiaon between the hot carbon tube (i. e. the source of heat) and the iron ore.

The preferred apparatus for the carrying out of the processes disclosed and for carrying out my inventions include the combination of a rotating inclined tube of carbon or similar material and an induction of coil surrounding this inclined tube generating sufficient heat in the tube to reduce ore travelling through the tube and to melt the metal so obtained. The preferred process includes the combination of the introduction of ore into a rotating inclined tube and inducing heat in the tube sufficient to reduce such ore and melt the metal. Thus there are disclosed several dependent inventions both in the apparatus and the process mutually contributing to a common result. These dependent inventions are believed to be of themselves patentable and thus permit considerable modification in certain instances, phases or features of dependent apparatus and processes although embraced within the scope of my inventions.

Thus, in certain phases my invention is not necessarily limited to iron oxide type ores, but other forms of reducible ores of iron or other metals may be adaptable. My invention in certain features is not necessarily limited to the metal reduction reaction but may be adaptable to other reactions where heating is required. The ingredients fed to the furnace may or may not be mixed prior to entering the furnace.

The heating tube is not necessarily limited to graphite carbon but may be of other suitable material. It should be an electrical conductor. It must have a relatively high melting point at a temperature appreciably higher than that of the metal being produced. The size or diameter of the tube may be varied over a wide range. The tube is preferably round but this is not absolutely essential.

Although I have shown both induction and resistance heating and although my invention may be applied with either type of heating, yet I prefer to use induction heating because thereby I am enabled to avoid some of the complications and difficulties of the use of resistance heating where such high temperatures are involved.

The outside of the carbon tube may be protected from burning or oxidation by coating as by cement, etc., covering as by a ceramic tube, blanketing as with an inert gas or by other means. In the embodiment illustrated in Fig. 1, a ceramic tube was used for this purpose. In the embodiment of Fig. 2 an inert gas is used.

Some reaction between the carbon tube and the iron ore may occur. This reaction would depend somewhat upon the percentage of carbon in the mixture and the time of residence of the mixture in the tube. In my previous operations of this process with substantial portions of carbon in the mixture, no evidence of appreciable attack on the carbon tube was observed.

My invention in certain phases is not limited to beneficiated ores. The undesirable ingredients in ores could be separated after reduction by the method embodied in this invention. A finely divided ore that is blown out of the top of the blast furnaces and collected could be reduced by this method.

My invention in certain phases is not limited to the production of a fused product. Solid state reactions occur at lower temperatures and complete or partially complete reduction may occur at these lower temperatures. In such cases it is not necessary that the tube have a higher melting point than the metal.

My invention is not limited to adding a particular proportion of carbon to the ore. My invention is not limited to the production of pig iron or iron with approximately 4% carbon. Iron ores containing $Fe_2O_3$ are sometimes called hematite ores and iron ores containing $Fe_3O_4$ are sometimes called magnetite ores. By my process hematite might be converted to magnetite. Hematite is essentially non-magnetic and magnetite is essentially magnetic. Changing hematite ores to magnetite ores would permit the use of magnetic separation as a beneficiation process.

My invention in certain phases is not necessarily limited to the materials fed into the furnace in finely divided form. Agglomerated mixture could also be used. Conventional methods for feeding material to the furnace, and for rotating the tube, and conventional furnace closures familiar to those skilled in this art, could be utilized.

Certain phases of my invention may be practiced where the furnace is not inclined or is not rotating or is neither inclined or rotating. In such cases the tube might be horizontal or vertical or inclined in the opposite direction. In such cases other means such as a screw or an intermittent pushing means could be utilized to propel the ore either horizontally or at any angle including the propulsion upward. If desired, such propulsion means could be used also as a supplement even where the tube is inclined and rotating as shown.

In certain phases of my invention I propose to use a partial vacuum or reduced pressures to remove carbon monoxide as it is formed to improve and/or accelerate the reaction.

This invention produces the desired results with and without the supplying of an inert gas to the interior of the furnace tube. The products from my furnace could be allowed to solidify or could be kept molten by means of a suitably heated receiver or container. If one chooses to receive the product from my furnace in a heated container to keep the product molten or to remelt it, the silica could be slagged off of the surface of the molten metal or otherwise removed.

The advantages of this invention should be apparent. The equipment could be placed near the mine or the beneficiation plant and the process carried on there. The result would be the shipment of iron to the steel plants, or to the users of iron, thus avoiding the actual cost of shipping the oxygen that is combined with the iron ore in substantial percentages by weight, when the ore is in the form of iron oxides. In some cases, hydraulic electric power is available at reasonable rates near the mine or beneficiation plant. The necessity of pelletizing or agglomerating the fine ores would be eliminated thus saving substantial amounts of time and money.

It is to be understood that the above described embodiments of my invention are for the purpose of illustration only and various changes may be made therein without departing from the spirit and scope of the invention.

In the treating of some ores I may melt not only the metal involved but also one or more or all of the constituents of the ore. I may even add other constituents to the ore which may or may not be melted during the process.

I claim:

1. A process of reducing iron ore comprising an iron oxide which comprises introducing the ore together with carbon into the top of a rotating inclined tube formed of a substance which is a conductor of electricity but which has a melting point appreciably higher than that of iron; inducing an electrical current in said tube to heat the tube, and by it, the ore, to a temperature above the melting point of iron; and rotating the tube while passing the mixture of ore and carbon through the tube so that the ore is reduced by the action of the carbon thereon at the elevated temperatures employed.

2. A process of reducing iron ore comprising a metal oxide which comprises introducing the iron ore into the top of a rotating inclined carbon tube together with carbon; inducing an electrical current in said tube; creating a partial vacuum in said tube; and passing the mixture of ore and carbon through the tube so that the metal oxide is reduced by the action of the carbon thereon at the elevated temperatures employed.

3. A process of reducing iron ore comprising iron oxide to iron which comprises introducing finely divided iron ore together with finely divided carbon into the top of a rotating inclined tube formed from a substance which is a conductor of electricity but has a melting point appreciably higher than that of the iron; creating an electrical current in said tube to heat the tube to a temperature above the melting point of the iron; and rotating the tube to pass the mixture of iron ore and carbon through the tube so that the iron oxide is reduced by the action of the carbon thereon at the elevated temperatures employed.

4. A process of reducing ore which comprises mixing carbon in powdered form and iron ore in powdered form; feeding the powders into a rotating carbon container; and causing an electric current to pass through the rotating container to heat the container and thereby to heat the powders to a temperature above the melting point of iron to reduce the iron ore to iron and to melt the iron.

5. A process of reducing ore which comprises mixing and grinding carbon and iron ore to powders; feeding the mixture of powders into a rotating carbon container; and causing an electric current to pass through the rotating container to heat the container and thereby to heat the mixture of powders to a temperature above the melting point of iron to reduce the iron ore to iron and to melt the iron.

6. A process of reducing iron ore which comprises introducing iron ore in powdered form together with carbon in powdered form into a rotating container which is a conductor of electricity and is formed of a material having a melting point above the melting point of iron; inducing an electrical current in said carbon container to heat the container to a temperature above the melting point of iron but below the melting point of the container and to thus heat the ore and carbon to a temperature above the melting point of iron; and passing the mixture of ore and carbon through the container so that the heated ore is reduced to metal by the action of the heated powdered carbon thereon at the elevated temperatures employed and the metal is melted thereby.

7. A process of reducing iron ore to metal which comprises mixing iron ore in powdered form together with carbon in powdered form; pelletizing the mixture of powders into small pellets; feeding the pellets into the top of a rotating inclined carbon tube; inducing an electrical current in said tube to heat the tube to a temperature above the melting point of iron; and rotating the tube while passing the mixture of ore and carbon through the tube so that the ore is heated and is reduced by the action of the carbon thereon at the elevated temperatures employed.

References Cited in the file of this patent

UNITED STATES PATENTS

| | | |
|---|---|---|
| 1,435,686 | Basset | Nov. 14, 1922 |
| 1,443,444 | Thornhill | Jan. 30, 1923 |
| 1,444,584 | Clamer et al. | Feb. 6, 1923 |
| 1,544,111 | Stansfield | June 30, 1925 |
| 1,691,349 | Harrington et al. | Nov. 13, 1928 |
| 1,763,229 | Fourment | June 10, 1930 |
| 1,786,202 | Fourment | Dec. 23, 1930 |
| 1,884,600 | Derby | Oct. 25, 1932 |
| 2,091,087 | Wempe | Aug. 24, 1937 |
| 2,156,263 | Kusaka et al. | May 2, 1939 |
| 2,266,002 | Clark | Dec. 16, 1941 |
| 2,281,170 | Payne | Apr. 20, 1942 |